US012672942B2

(12) United States Patent
Lim et al.

(10) Patent No.: US 12,672,942 B2
(45) Date of Patent: Jul. 7, 2026

(54) ARTIFICIAL TOOTH AND MANUFACTURING METHOD THEREFOR

(71) Applicant: HASS CO., LTD., Gangwon-do (KR)

(72) Inventors: Hyung Bong Lim, Gyeonggi-do (KR); Joon Hyung Kim, Gyeonggi-do (KR); Sung Min Kim, Gyeonggi-do (KR); Si Won Son, Seoul (KR); Hyun Jun Jeon, Busan (KR)

(73) Assignee: HASS CO., LTD., Gangwon-do (KR)

( * ) Notice: Subject to any disclaimer, the term of this patent is extended or adjusted under 35 U.S.C. 154(b) by 537 days.

(21) Appl. No.: 18/063,996

(22) Filed: Dec. 9, 2022

(65) Prior Publication Data

US 2023/0105601 A1     Apr. 6, 2023

Related U.S. Application Data

(63) Continuation of application No. PCT/KR2021/007181, filed on Jun. 9, 2021.

(30) Foreign Application Priority Data

Jul. 24, 2020     (KR) ......................... 10-2020-0092432

(51) Int. Cl.
*A61C 13/00* (2006.01)
*A61C 8/00* (2006.01)

(52) U.S. Cl.
CPC .......... *A61C 8/0051* (2013.01); *A61C 8/0013* (2013.01); *A61C 8/0039* (2013.01); *A61C 8/0069* (2013.01); *A61C 8/0074* (2013.01); *A61C 13/0006* (2013.01)

(58) Field of Classification Search
CPC . A61C 13/0022; A61C 8/0051; A61C 8/0013; A61C 8/0039; A61C 8/0069; A61C 8/0074; A61C 13/0006
See application file for complete search history.

(56) References Cited

U.S. PATENT DOCUMENTS

| | | | | |
|---|---|---|---|---|
| 5,169,308 A | * | 12/1992 | Kvist | ................... A61C 8/0068 433/172 |
| 6,991,853 B2 | * | 1/2006 | Branco de Luca | ......................... A61C 13/0022 433/201.1 |
| 9,926,223 B2 | * | 3/2018 | Kim | ......................... C03C 8/24 |

(Continued)

FOREIGN PATENT DOCUMENTS

| | | |
|---|---|---|
| JP | 2017-046794 A | 3/2017 |
| JP | 2019-195617 A | 11/2019 |

(Continued)

*Primary Examiner* — Ralph A Lewis
(74) *Attorney, Agent, or Firm* — NKL Law; Jae Youn Kim

(57) ABSTRACT

An artificial tooth includes a prosthesis and an abutment including an insertion part inserted into the prosthesis in one direction and a protruding part protruding from the prosthesis, wherein the insertion part is slantingly formed so that the diameter of the outer peripheral surface of the insertion part increases in the one direction, and the protruding part is slantingly formed so that the diameter of the outer peripheral surface of the protruding part decreases in the one direction, and when the prosthesis is a workpiece structure, one end portion of the protruding part is coupled to an artificial tooth processing device.

6 Claims, 6 Drawing Sheets

<u>1</u>

(56)            References Cited

U.S. PATENT DOCUMENTS

| | | | |
|---|---|---|---|
| 11,759,290 B2 * | 9/2023 | Kim | C03C 4/0021 |
| | | | 65/33.1 |
| 2010/0068674 A1 * | 3/2010 | Zucker | A61C 8/0056 |
| | | | 264/16 |
| 2010/0323324 A1 | 12/2010 | Kim | |
| 2011/0104643 A1 * | 5/2011 | Giordano | A61C 13/0022 |
| | | | 264/16 |
| 2011/0183281 A1 * | 7/2011 | Jensen | A61L 27/306 |
| | | | 427/2.27 |
| 2012/0251979 A1 | 10/2012 | Karim et al. | |
| 2015/0272709 A1 | 10/2015 | Kim | |
| 2016/0184061 A1 * | 6/2016 | Bertagnon | A61C 13/0006 |
| | | | 409/225 |
| 2020/0015941 A1 * | 1/2020 | Mashio | A61C 8/005 |
| 2020/0038147 A1 | 2/2020 | Chernovol | |
| 2023/0030155 A1 * | 2/2023 | Kim | A61C 8/0051 |
| 2023/0105601 A1 * | 4/2023 | Lim | A61C 8/0051 |
| | | | 433/201.1 |
| 2023/0248493 A1 * | 8/2023 | Lim | A61C 13/087 |
| | | | 433/173 |

FOREIGN PATENT DOCUMENTS

| | | | |
|---|---|---|---|
| KR | 2008-0052045 A | 6/2008 | |
| KR | 10-00912271 B | 8/2009 | |
| KR | 2010-0128433 A | 12/2010 | |
| KR | 2013-0127727 A | 11/2013 | |
| KR | 10-1839424 B | 3/2018 | |
| KR | 10-2068525 B | 1/2020 | |
| KR | 10-2073325 B | 1/2020 | |
| KR | 2021-0083662 A | 7/2021 | |
| WO | 2019/063127 A1 | 4/2019 | |

* cited by examiner

<u>1</u>

ARTIFICIAL TOOTH AND MANUFACTURING METHOD THEREFOR

CROSS REFERENCE TO RELATED APPLICATIONS

This is a continuation of International Application No. PCT/KR2021/007181 filed on Jun. 9, 2021, which claims priority from Korean Patent Application No. 10-2020-0092432 filed on Jul. 24, 2020. The contents of these applications are incorporated herein by reference in their entireties.

TECHNICAL FIELD

The present disclosure relates generally to an artificial tooth and a manufacturing method therefor. More particularly, the present disclosure relates to an artificial tooth which includes a prosthesis structure formed to be integrated with an abutment inserted into an implant, and a manufacturing method therefor.

BACKGROUND

A dental implant refers to an artificial tooth structure formed by attaching an artificial tooth root to an alveolar bone after planting the artificial tooth root is planted in an area in which teeth are partially or wholly lost, and fixing a tooth prosthesis to the artificial tooth root, or a dental treatment method therefor.

Generally, a dental implant consists of three parts: a fixture which is implanted in an alveolar bone and functions as an artificial tooth root; an abutment which is coupled to the fixture and is raised above a patient's gum; and an artificial tooth fastened to the abutment.

The fixture is a fixing body that is planted in the alveolar bone of a defective tooth area, such as the root of a natural tooth and is constructed to support the artificial tooth, and the abutment is also called an abutting tooth and is configured to connect the artificial tooth with the fixture implanted in the alveolar bone, and the artificial tooth is fixed in an oral cavity by the abutment and is configured to reproduce the same shape and function as a natural tooth.

In an implant treatment process, the fixture is implanted in the alveolar bone of a gum to which an artificial tooth is intended to be fixed, and after a predetermined period of time, the alveolar bone and the fixture go through a hardening process, and the abutment is fastened to the fixture. In addition, the process of taking an impression that imitates the appearance of tissue in the oral cavity is performed before the abutment is fastened to the fixture.

However, in a conventional manufacturing method of the artificial tooth, a process in which a workpiece block is processed by being connected to a processing device, is separated from the processing device, and is coupled to the abutment is required to be performed sequentially, so manufacturing time is long. In addition, after processing the artificial tooth, the process of coupling the artificial tooth to the abutment is required to be performed manually, so the accuracy of the coupling position of the abutment and the artificial tooth is low, and when the abutment is coupled to an inaccurate position, the coupling work is required to be performed again, thereby lengthening procedure time.

BRIEF SUMMARY

The present disclosure has been made to solve the above problems, and the present disclosure is intended to propose an artificial tooth and a manufacturing method of the artificial tooth in which a process of coupling a workpiece structure to a separate abutment can be omitted.

In addition, the present disclosure is intended to propose an artificial tooth and a manufacturing method of the artificial tooth in which by using an adapter of an artificial tooth processing device having the same internal structure as the internal structure a fixture to which the abutment is coupled, a tooth-shaped crown is accurately processed by considering the implanting position of the fixture.

An artificial tooth according to one embodiment of the present disclosure includes: a prosthesis; and an abutment comprising an insertion part inserted into the prosthesis in one direction and a protruding part protruding from the prosthesis, wherein the insertion part is slantingly formed so that a diameter of an outer peripheral surface of the insertion part increases in the one direction, and the protruding part is slantingly formed so that a diameter of an outer peripheral surface of the protruding part decreases in the one direction, and when the prosthesis is a workpiece structure, one end portion of the protruding part is coupled to an artificial tooth processing device.

The prosthesis may include a through hole passing through the inside of the prosthesis the one direction. The abutment may have a seating hole in which a first side of a connection part is seated, and an insertion hole which is smaller in a diameter than the seating hole and through which a second side of the connection part passes. When the prosthesis is a tooth-shaped crown, the one end portion of the protruding part may be coupled to a fixture implanted in an alveolar bone. The artificial tooth may further include: a buffer part which is located by covering the outer peripheral surface of the insertion part and includes zirconia. The workpiece structure may have a cylindrical shape.

A manufacturing method of the artificial tooth according to one embodiment of the present disclosure includes: providing the workpiece structure provided with an abutment; coupling one side of the abutment to the artificial tooth processing device; processing the workpiece structure into the tooth-shaped crown by the artificial tooth processing device; separating the abutment from the artificial tooth processing device; and coupling the tooth-shaped crown formed integrally with the abutment to the fixture implanted in the alveolar bone.

In the artificial tooth and the manufacturing method of the artificial tooth according to the present disclosure, the process of coupling the workpiece structure to a separate abutment is omitted, so processing time can be decreased, and the process of re-performing a coupling work due to inaccuracy of position of the coupling of the abutment to the workpiece structure can be prevented.

In addition, the abutment is connected to an adapter having the same internal shape as the internal shape of the fixture and is processed, so it is possible to accurately process a preset tooth-shaped crown by considering the implanting position, depth, rotation angle of the fixture.

DETAILED DESCRIPTION

Advantages and characteristics of the present disclosure, and methods for achieving the same will become clear with reference to embodiments described later in detail in conjunction with the accompanying drawings.

However, the present disclosure is not limited to the embodiments disclosed below and the embodiments will be implemented in various different forms. However, the embodiments are provided to make the present disclosure complete, and to completely inform those skilled in the art of the scope of the disclosure to which the present disclosure belongs, and the present disclosure is defined only by the scope of the claims.

Hereinafter, the artificial tooth according to the embodiments of the present disclosure and the manufacturing method of the artificial tooth will be described in detail with reference to FIGS. 1 to 6. In describing the present disclosure, detailed descriptions of related known functions or configurations are omitted in order not to obscure the subject matter of the present disclosure.

Figure 1:
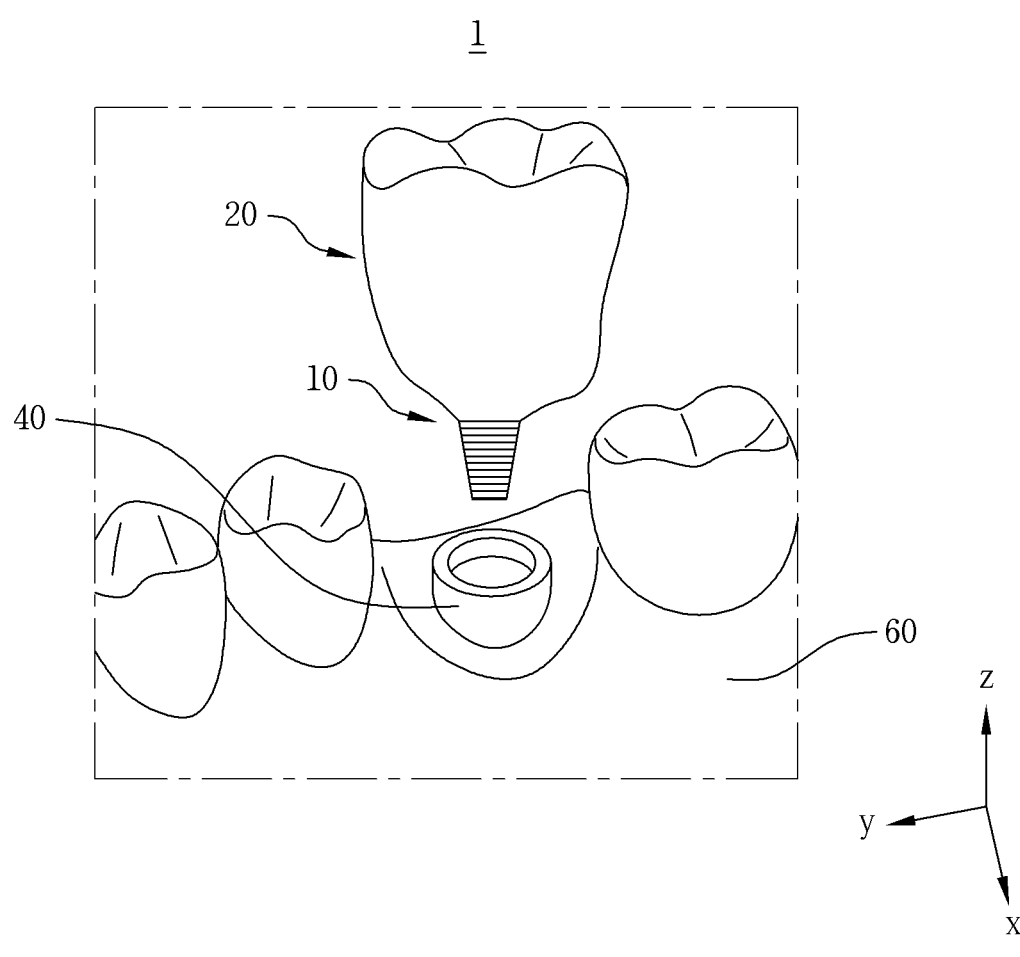
FIG. 1 is a view roughly illustrating an example of the application of an artificial tooth according to an embodiment of the present disclosure.
Figure 2:
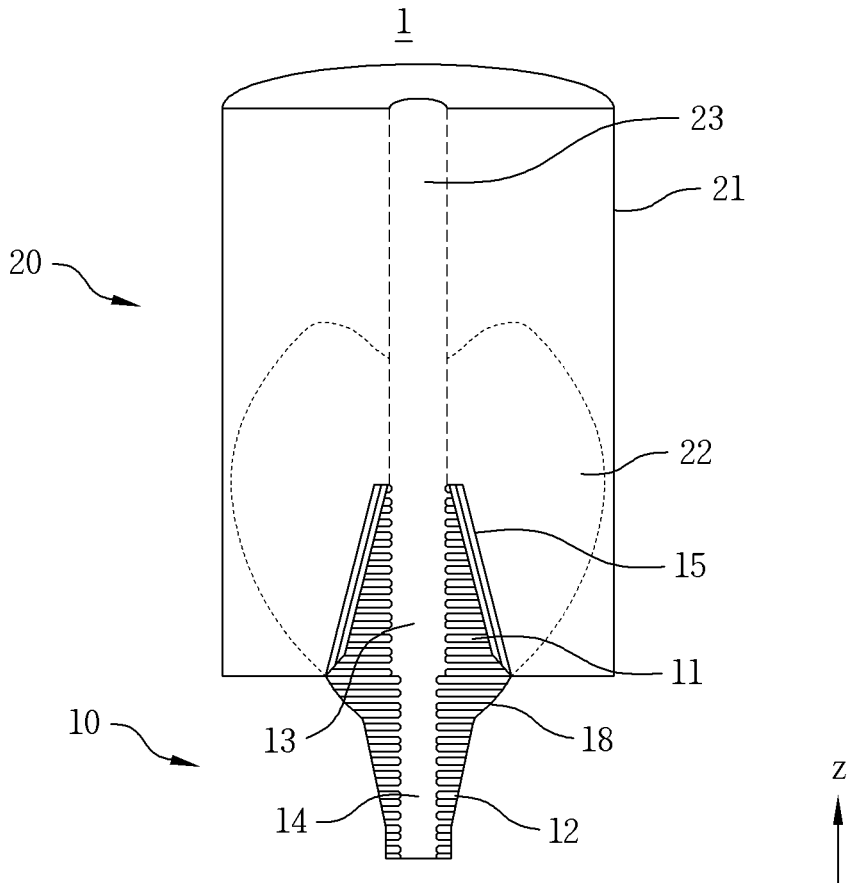
FIG. 2 is a sectional view roughly illustrating the section of the artificial tooth according to the embodiment of the present disclosure.
Figure 3:
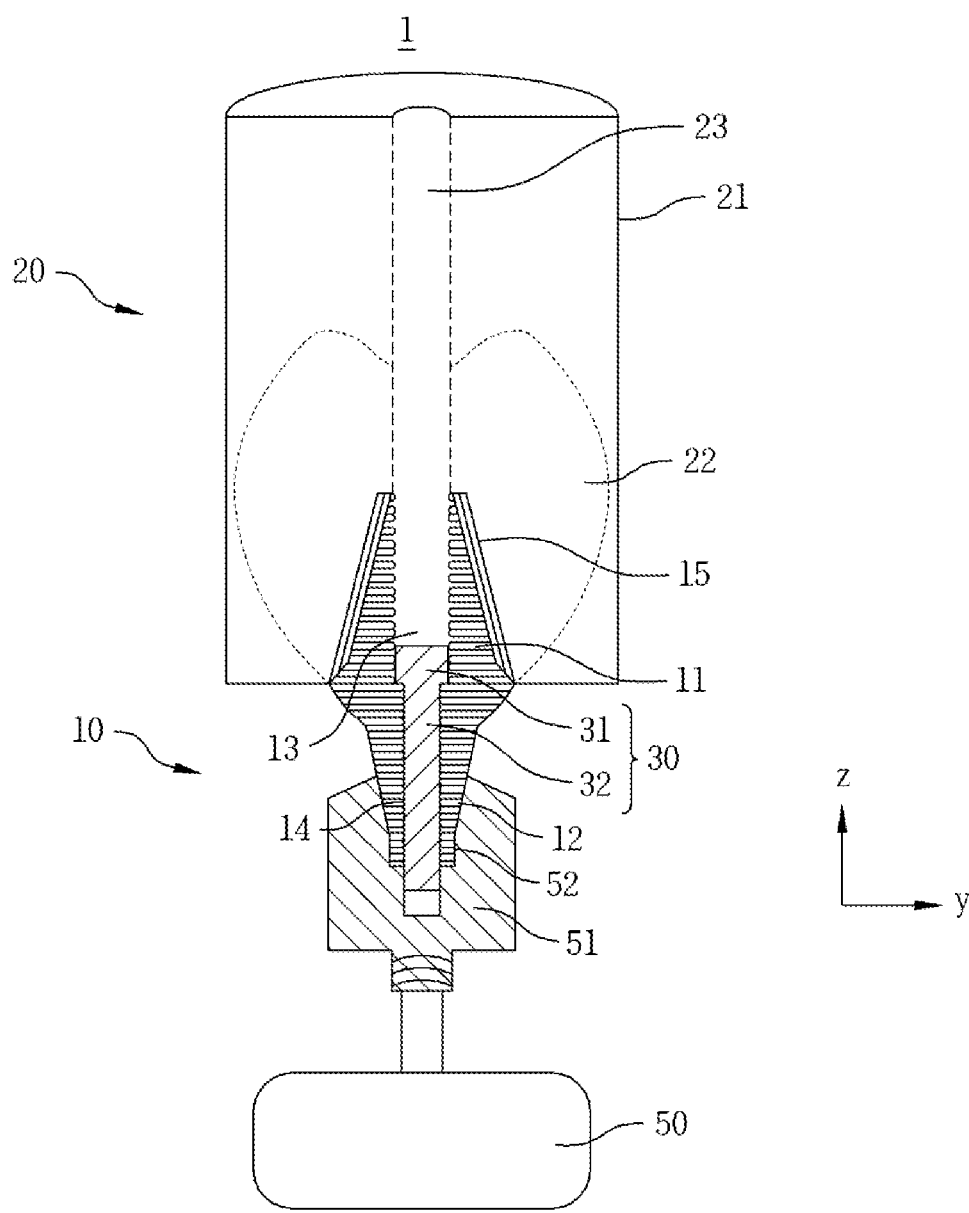
FIG. 3 is a sectional view roughly illustrating a section of the artificial tooth according to the embodiment of the present disclosure and a processing device coupled to each other.
Figure 4:
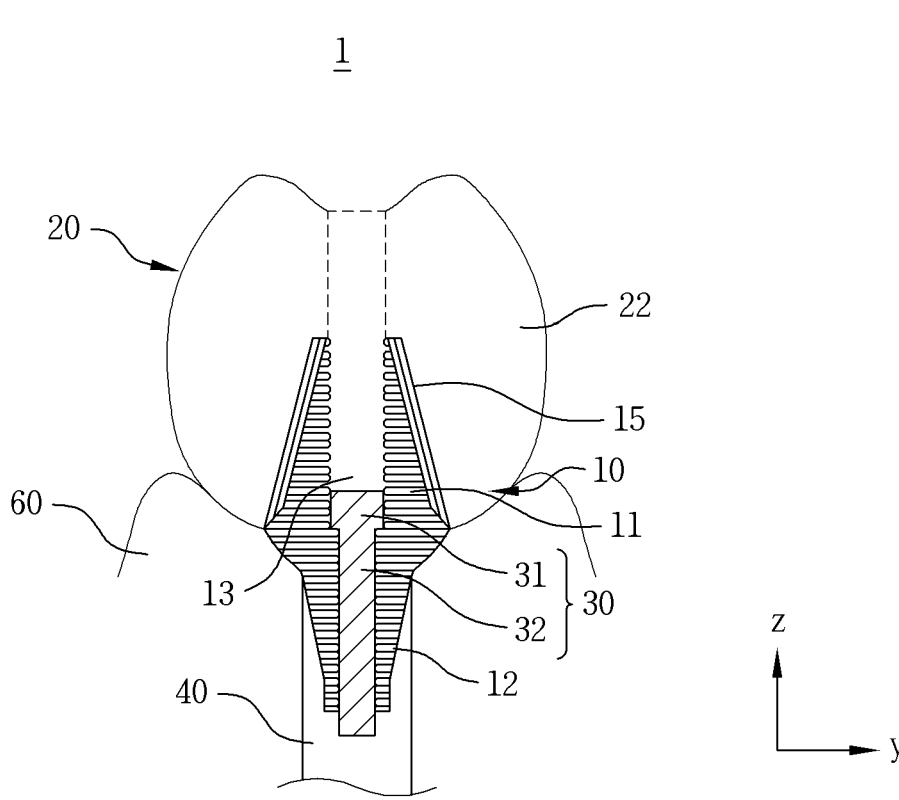
FIG. 4 is a sectional view roughly illustrating a section of the artificial tooth and a connection part coupled to each other according to the embodiment of the present disclosure.
Figure 5:
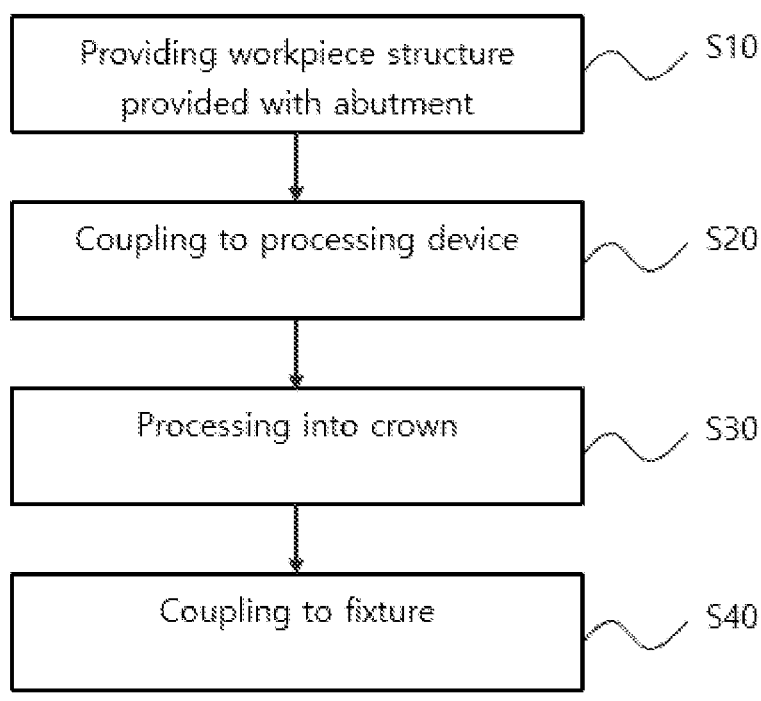
FIG. 5 is a flowchart roughly illustrating a manufacturing method of the artificial tooth according to the embodiment of the present disclosure.
Figure 6:
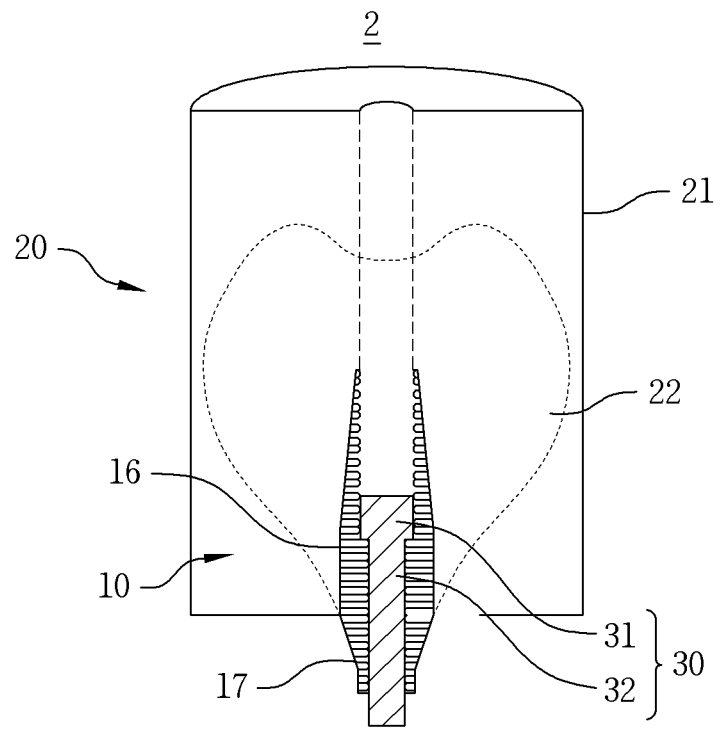
FIG. 6 is a sectional view roughly illustrating the section of an artificial tooth according to another embodiment of the present disclosure.
Figure 6:
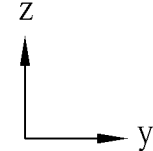

FIG. 1 is a view roughly illustrating an example of the application of an artificial tooth according to an embodiment of the present disclosure, FIG. 2 is a sectional view roughly illustrating the section of the artificial tooth according to the embodiment of the present disclosure, FIG. 3 is a sectional view roughly illustrating a section of the artificial tooth according to the embodiment of the present disclosure and a processing device coupled to each other, FIG. 4 is a sectional view roughly illustrating a section of the artificial tooth and a connection part are coupled to each other according to the embodiment of the present disclosure, FIG. 5 is a flowchart roughly illustrating the manufacturing method of the artificial tooth according to the embodiment of the present disclosure, and FIG. 6 is a sectional view roughly illustrating the section of an artificial tooth according to another embodiment of the present disclosure.

As illustrated in FIGS. 1 and 2, the artificial tooth 1 proposed in the present disclosure may include an abutment 10 and a prosthesis 20. The prosthesis 20 may be a workpiece structure 21 before being processed into a tooth shape, or may be a tooth-shaped crown 22 formed by the CAD/CAM processing of the workpiece structure 21.

While the abutment 10 is formed integrally with the prosthesis 20, the prosthesis 20 may be connected to an artificial tooth processing device or to a fixture 40 implanted in an alveolar bone 60. Screw threads may be formed in the abutment 10.

In a case in which the prosthesis 20 is the workpiece structure 21, while the abutment is formed integrally with the prosthesis 20, the abutment 10 may be engaged with and coupled to threads formed in the processing device. In a case in which the prosthesis 20 is the tooth-shaped crown 22, while the abutment 10 is formed integrally with the prosthesis 20, the abutment 10 may be engaged with and coupled to threads formed in the fixture 40.

In conventional technology, it is required to sequentially perform a series of processes in which the workpiece structure is connected separately to the processing device, and a processed crown is separated from the processing device, is coupled separately to the abutment, and is connected to the fixture.

On the other hand, in the artificial tooth 1 proposed in the present disclosure, the abutment 10 and the prosthesis 20 may be formed to be integrated with each other, and thus in this state, the abutment 10 is threaded to the processing device to process the prosthesis 20, and is separated from the processing device, and may be threaded directly to the fixture 40. Accordingly, in the processing of the artificial tooth 1, a process of separately connecting the workpiece structure to the processing device and a process of coupling the workpiece structure to a separate abutment among the processes of the conventional processing can be omitted, so processing time of the artificial tooth 1 can be decreased. In addition, in the artificial tooth 1 proposed in the present disclosure, the prosthesis 20 may be provided with the abutment 10, so it is possible to prevent the process of performing the coupling work again due to the inaccuracy of the position of the coupling of the abutment to the workpiece structure according to the conventional technology.

Hereinafter, the structure of the artificial tooth 1 and the manufacturing method of the artificial tooth 1 will be described in more detail with reference to FIGS. 2 to 6.

As illustrated in FIG. 2, the prosthesis 20 may have through hole 23 formed by passing through the inside of the prosthesis 20 in a z-axis direction and may have a cylindrical shape. When the prosthesis 20 has a cylindrical shape, it is possible to minimize the amount of processed grit that may occur when the workpiece structure 21 is processed into the tooth-shaped crown 22.

The abutment 10 may extend along the z-axis direction, and may have a tubular shape. The abutment 10 may include an insertion part 11 and a protruding part 12. The insertion part 11 may be located inside the prosthesis 20. The insertion part 11 may have a shape of a truncated cone, and may be slantingly formed such that the diameter of the outer peripheral surface of the insertion part increases in the z-axis direction. The insertion part 11 may have a seating hole 13 formed by passing through the inside of the insertion part 11 in the z-axis direction. The seating hole 13 may be positioned by facing the through hole 23.

In the abutment 10, the insertion part 11 has a shape having the diameter of an outer peripheral surface increasing in a downward direction, so when an external force is applied to the insertion part 11, the external force can be gradually dispersed toward the lower part of the insertion part 11, and the support stability of the abutment 10 for the prosthesis 20 can be increased. In addition, the insertion part 11 may have a contact area with the prosthesis 20 increasing downward while the insertion part 11 is located inside the prosthesis 20, so the mechanical strength of the abutment 10 formed integrally with the prosthesis 20 can be reinforced.

The diameter of the outer peripheral surface of the lower end part of the insertion part 11 may be 1.5 to 2.5 times larger than the diameter of the outer peripheral surface of the upper end part of the insertion part 11. When the diameter of the outer peripheral surface of the lower end part of the insertion part 11 is less than 1.5 times the diameter of the outer peripheral surface of the upper end part of the insertion part 11, the insertion part 11 has a right angle shape with almost no inclination, so it may be difficult to disperse external force in a direction toward the lower part of the insertion part 11. In addition, when the diameter of the outer peripheral surface of the lower end part of the insertion part 11 is more than 2.5 times the diameter of the outer peripheral surface of the upper end part of the insertion part 11, a manufacturing cost may increase. Accordingly, the diameter of the outer peripheral surface of the lower end part of the insertion part 11 is preferably adjusted within the above-mentioned range according to the diameter of the outer peripheral surface of the upper end part of the insertion part 11.

The protruding part 12 may be connected to the insertion part 11 and may be located outside the prosthesis 20. The protruding part 12 may have a spindle shape, be rounded toward the inside of the protruding part 12, and may extend in the z-axis direction. The rounding part 18 may flexibly come into contact with surrounding gums when the abutment 10 is inserted into the fixture 40 placed in the alveolar bone 60. An insertion hole 14 may be formed in the protruding part 12 by passing through the protruding part 12 along the z-axis direction. The insertion hole 14 may be connected to the seating hole 13 and may have a diameter smaller than the diameter of the seating hole 13.

Meanwhile, the abutment 10 may include a titanium material, a chrome material, a cobalt material, platinum, gold, or an alloy thereof, and the prosthesis 20 may include crystallized glass, polymers, and ceramics. In this case, the abutment 10 may include a buffer part 15 which is located by covering the outer peripheral surface of the insertion part 11 and is made of zirconia. When the prosthesis 20 is provided with the abutment 10, the buffer part 15 can prevent fracture due to difference in physical properties between the prosthesis 20 and the abutment 10 in advance.

When the prosthesis 20 includes a material with excellent biocompatibility such as crystallized glass or ceramics, the position of a crown marginal line may be placed sub-gingivally, so it is possible to minimize penetration of bacteria due to excellent initial adhesion between a gingiva and a crown. The abutment 10 contains an antibacterial substance and acts as an antibacterial agent against bacteria in a surrounding tissue, thereby preventing adhesion failure due to bacterial infection.

In summary, in the artificial tooth 1 proposed in the present disclosure, the abutment 10 and the prosthesis 20 are formed to be integrated with each other, and the sectional area of the insertion part 11 in which the outer surface of the abutment 10 and the inner surface of the prosthesis 20 are in contact with each other has a shape in which the insertion part 11 has the diameter of the outer peripheral surface increasing gradually in a downward direction, thereby dispersing external force and increasing support stability. Furthermore, in a state in which the abutment 10 and the prosthesis 20 are formed to be integrated with each other, when the abutment 10 is coupled to the fixture 40, the abutment 10 may be flexibly seated therein while movement thereof is prevented without damaging surrounding gums through the rounding part 18.

As illustrated in FIG. 3, the artificial tooth 1 may be connected to the artificial tooth processing device 50 while the abutment 10 and the prosthesis 20 are formed to be integrated with each other. The artificial tooth processing device 50 may be a CAD/CAM milling machine. The adapter 51 may be formed in the artificial tooth processing device 50, and may securely couple the abutment 10 to the artificial tooth processing device 50.

The adapter 51 and the abutment 10 may be coupled to each other by the connection part 30 by using threads formed in the protruding part 12 and threads formed in the adapter 51. The connection part 30 may include a head part 31 and a body part 32 and may have a screw shape. The connection part 30 may be inserted into the abutment 10, and the head part 31 may be located in the seating hole 13, and the body part 32 may be located in the insertion hole 14.

While threads formed in the inside of the adapter 51 and threads formed in the outside of the protruding part 12 are engaged with each other, the adapter 51 and the abutment 10 are firstly connected to each other and are secondly connected to each other while the threads of the connection part 30 are engaged with the threads of the inside of the adapter 51 in a state in which the connection part 30 has passed through the inside of the abutment 10. That is, the adapter 51 and the abutment 10 may be securely coupled to each other through two coupling processes.

The adapter 51 may have the same internal structure as the internal structure of the fixture 40 to which the abutment 10 is coupled after the prosthesis 20 is processed, and threads 52 having the same shape as the shape of the threads of the fixture 40 may be formed inside the adapter 51.

In a state in which the abutment 10 and the prosthesis 20 are formed to be integrated with each other, when the abutment 10 is connected to the adapter 51 having the same internal shape as the fixture 40 and is processed, the implanting position, depth, and rotation angle of the fixture 40 to be finally fastened may be considered, so it is possible to accurately process the tooth-shaped crown 22 which is preset.

Hereinafter, the manufacturing method of the artificial tooth 1 will be described in more detail with reference to FIGS. 3 to 5.

As illustrated in FIGS. 3 to 5, the manufacturing method of the artificial tooth 1 may include providing the workpiece structure 21 provided with the abutment 10 at S10. In the providing of the workpiece structure at S10 a separate process of coupling a workpiece block to the abutment 10 may be omitted, which can reduce manufacturing time to increase manufacturing efficiency.

Next, the manufacturing method may include coupling a side of the abutment 10 to the artificial tooth processing device 50 at S20 in a state in which the workpiece structure 21 and the abutment 10 are formed integrally with each other. The coupling of the abutment at S20 may include providing the adapter 51 having the same internal shape as the internal shape of the fixture 40; coupling a side of the abutment 10 to the artificial tooth processing device 50 through the adapter 51; and inserting the connection part 30 into the abutment 10 such that the abutment 10 and the adapter 51 are fixed to each other.

In addition, the manufacturing method may include processing the workpiece structure 21 into the tooth-shaped crown 22 by the artificial tooth processing device 50 at S30. In the processing of the workpiece structure 21 into the tooth-shaped crown, the workpiece structure 21 may be processed into the tooth-shaped crown 22 by the CAD/CAM milling process of the workpiece structure 21 according to a patient's preset tooth shape. Next, the manufacturing method may include separating the abutment 10 from the artificial tooth processing device 50. In addition, the manufacturing method may include coupling the tooth-shaped crown 22 formed integrally with the abutment 10 to the fixture 40 implanted in the alveolar bone 60.

In the manufacturing method of the artificial tooth 1 proposed in the present disclosure, the abutment 10 may be provided integrally with and the workpiece structure 21 and may be connected to the artificial tooth processing device through the adapter 51 having the same shape as the internal shape of the fixture 40 to be coupled to the tooth-shaped crown 22 processed in the workpiece structure 21. Accordingly, the tooth-shaped crown 22 can be accurately processed by considering the implanting position of the fixture 40 to be finally coupled.

The artificial tooth of FIG. 6 is similar to the artificial tooth 1 of FIG. 2 except for an insertion part 16 and a protruding part 17, and the same reference numerals are used for the same parts, and the detailed descriptions thereof are omitted.

As illustrated in FIG. 6, the artificial tooth 2 may include an abutment 10 composed of the insertion part 16 and the protruding part 17. The insertion part 16 may be located inside the prosthesis 20, and the protruding part 17 may be located outside the prosthesis 20 by being connected to the insertion part 16.

The insertion part 16 may slantingly extend such that the diameter of the outer peripheral surface of the insertion part 16 increases in the z-axis direction and may extend by stretching in the form of a straight line parallel to a z-axis. That is, the insertion part 16 may extend by including an inclination part inclined to gradually increase the contact area of the insertion part 16 with the prosthesis 20 downward, and a flat part connected to the inclination part and stretching in the form of a straight line. When the insertion part 16 includes the flat part stretching in the form of a straight line, adhesion between the insertion part 16 and the prosthesis 20 is constantly generated, so the durability of the abutment 10 can be increased.

Although the exemplary embodiments of the present disclosure have been described in detail above, the scope of claims of the present disclosure is not limited thereto, and various modifications and improvements by those skilled in the art by using the basic concept of the present disclosure defined in the following claims also fall within the scope of the claims of the present disclosure.

The present disclosure relates generally to the artificial tooth and the manufacturing method therefor. More particularly, the present disclosure relates to the artificial tooth which includes a prosthesis structure formed to be integrated with the abutment inserted into the implant, and the manufacturing method therefor.

In the artificial tooth of the present disclosure and the manufacturing method thereof, the process of coupling the workpiece structure to a separate abutment may be omitted, and by using the adapter of the artificial tooth processing device, which has the same internal structure as the internal structure of the fixture to which the abutment is coupled, the tooth-shaped crown can be accurately processed by considering the position of the fixture to be implanted.

The invention claimed is:

1. An artificial tooth comprising:
a prosthesis;
an abutment comprising an insertion part inserted into the prosthesis in one direction and a protruding part protruding from the prosthesis; and
a buffer part which is located to cover an outer peripheral surface of the insertion part and comprises zirconia, the buffer part being entirely embedded within the prosthesis and positioned at an interface between the insertion part and the prosthesis,
wherein the insertion part is slantingly formed so that a diameter of the outer peripheral surface of the insertion part increases in the one direction, and the protruding part is slantingly formed so that a diameter of an outer peripheral surface of the protruding part decreases in the one direction, and when the prosthesis is a workpiece structure, one end portion of the protruding part is coupled to an artificial tooth processing device, and
wherein the prosthesis comprises at least one of crystallized glass, polymers, or ceramics, and the abutment comprises at least one of a titanium material, a chrome material, a cobalt material, platinum, gold, or an alloy thereof.

2. The artificial tooth of claim 1, wherein the prosthesis comprises a through hole passing through an inside of the prosthesis in the one direction.

3. The artificial tooth of claim 2, further comprising a connection part passing through an inside of the abutment, wherein the abutment has a seating hole in which a first side of the connection part is seated, and an insertion hole which is smaller in a diameter than the seating hole and through which a second side of the connection part passes.

4. The artificial tooth of claim 3, wherein when the prosthesis is a tooth-shaped crown, the one end portion of the protruding part is coupled to a fixture implanted in an alveolar bone.

5. The artificial tooth of claim 1, wherein the workpiece structure has a cylindrical shape.

6. A manufacturing method of the artificial tooth of claim 1, the method comprising:
providing the workpiece structure provided with the abutment;
coupling one side of the abutment to the artificial tooth processing device;
processing the workpiece structure into a tooth-shaped crown by the artificial tooth processing device;
separating the abutment from the artificial tooth processing device; and
coupling the tooth-shaped crown formed integrally with the abutment to a fixture implanted in an alveolar bone.

* * * * *